(12) United States Patent
Ugale et al.

(10) Patent No.: US 12,477,636 B2
(45) Date of Patent: Nov. 18, 2025

(54) LIGHT CONTROL MODULE FOR DRIVING LED MODULES

(71) Applicant: Infineon Technologies AG, Neubiberg (DE)

(72) Inventors: Ramdas Rangnath Ugale, Villach (AT); Fausto Borghetti, Valpolicella (IT); Stephan Cordes, Augsburg (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 167 days.

(21) Appl. No.: 18/361,044

(22) Filed: Jul. 28, 2023

(65) Prior Publication Data

US 2024/0040684 A1    Feb. 1, 2024

(30) Foreign Application Priority Data

Jul. 29, 2022   (DE) .......................... 102022119081.1

(51) Int. Cl.
*H05B 45/54*     (2020.01)
*H05B 45/3725*   (2020.01)

(52) U.S. Cl.
CPC ......... *H05B 45/54* (2020.01); *H05B 45/3725* (2020.01)

(58) Field of Classification Search
CPC ....................... H05B 45/3725; H05B 45/50–56
See application file for complete search history.

(56) References Cited

U.S. PATENT DOCUMENTS

| 2008/0130288 A1* | 6/2008 | Catalano | H05B 45/10 315/246 |
| 2013/0049599 A1 | 2/2013 | Logiudice | |
| 2016/0081171 A1* | 3/2016 | Ichikawa | H05B 47/25 315/77 |
| 2019/0098710 A1 | 3/2019 | Murakami et al. | |
| 2021/0265838 A1* | 8/2021 | White | H02J 1/14 |
| 2023/0090191 A1* | 3/2023 | Suyama | H05B 45/38 315/307 |

FOREIGN PATENT DOCUMENTS

| DE | 10137338 A1 | 2/2003 |
| DE | 102012107882 A1 | 2/2013 |
| DE | 102015217712 A1 | 3/2016 |
| DE | 102018216098 A1 | 3/2019 |
| WO | WO-2021131242 A1 * | 7/2021 |

OTHER PUBLICATIONS

Translation of WO-2021131242-A1 (Year: 2021).*

* cited by examiner

*Primary Examiner* — Renan Luque
(74) *Attorney, Agent, or Firm* — Slater Matsil, LLP

(57) ABSTRACT

A light control module (LCM) in accordance with one embodiment, includes terminals configured to receive a supply voltage, and a switching converter configured to receive the supply voltage and to provide an output voltage at an output node, wherein the output voltage and the supply voltage have different polarities. Further, the LCM includes an output terminal coupled to the output node of the switching converter and configured to sink a load current from a LED module.

20 Claims, 3 Drawing Sheets

LIGHT CONTROL MODULE FOR DRIVING LED MODULES

This application claims the benefit of German Patent Application No. 102022119081.1, filed on Jul. 29, 2022, which application is hereby incorporated herein by reference.

TECHNICAL FIELD

The present disclosure relates generally to the field of lighting and LED applications, such as and more specifically to such as a light control module for driving LED modules, such as in automobiles.

BACKGROUND

Today, Light Emitting Diodes (LEDs) have practically replaced light bulbs in automotive applications (including two- and three-wheelers). So-called Light Control Modules (LCMs) detect user input (e.g. via micro switches) and distribute power to LED modules, which are used, for example, as head-lights, tail-lights, stop lights, turn signals, ambient lighting, etc. The function of an LCM can also be included in a Body Control Module (BCM), which may have a more complex functionality as compared to an LCM.

The LED modules may be located remotely from the LCM. That is, some LED modules may be connected to the LCM via a cable of several meters of length, which is installed in the vehicle body. Such a structure (central LCM/remotely arranged LED modules) may be prone to failure, particularly if a specific LED module includes only a small number of LEDs connected in series and thus requires a supply voltage smaller than the typical battery voltage (e.g. 13.8 volts). If, for some reason, the cable between LCM and LED module is short-circuited to battery voltage, then the LED module may be destroyed due to an overcurrent.

There is a need for improved driving of LED modules with LCMs, particularly in automotive applications.

SUMMARY

A light control module (LCM) is described herein. In accordance with one embodiment, the LCM includes terminals configured to receive a supply voltage, and a switching converter configured to receive the supply voltage and to provide an output voltage at an output node, wherein the output voltage and the supply voltage have different polarities. Further, the LCM includes an output terminal coupled to the output node of the switching converter and configured to sink a load current from a LED module.

BRIEF DESCRIPTION OF THE DRAWINGS

Embodiments of invention can be better understood with reference to the following drawings and descriptions. The components in the figures are not necessarily to scale; instead emphasis is placed upon illustrating the principles of the invention. Moreover, in the figures, like reference numerals designate corresponding parts. In the drawings.

DETAILED DESCRIPTION OF ILLUSTRATIVE EMBODIMENTS

Figure 1:
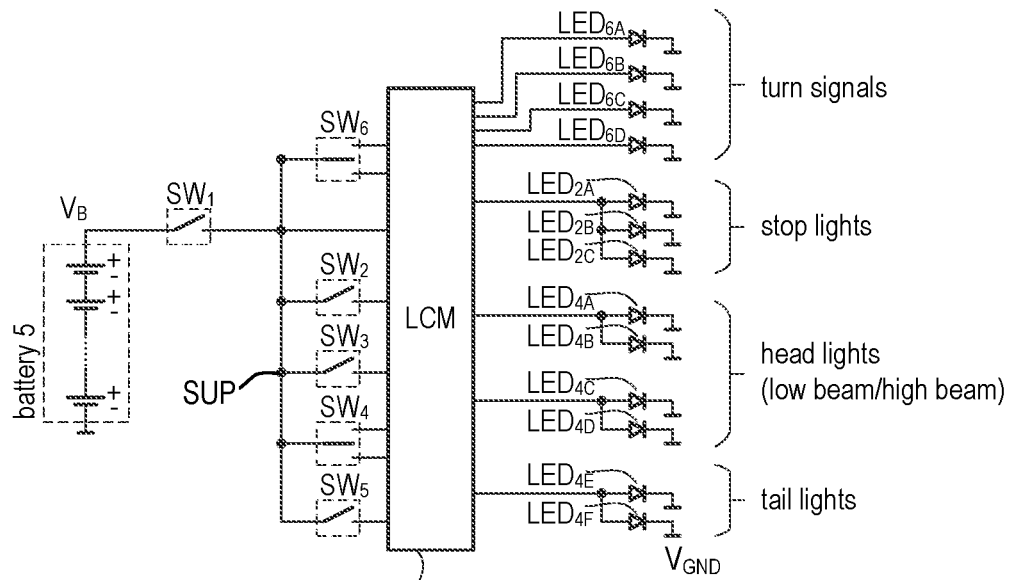
FIG. 1 illustrates the structure of a conventional automotive lighting system, in which a conventional LCM distributes power to a plurality of LED modules.

FIG. 1 illustrates a typical structure of a conventional automotive lighting system, in which a conventional LCM distributes power to a plurality of LED modules. In accordance with the depicted example, the LCM 10 is supplied by an automotive battery 5 (battery voltage $V_B$) via a main switch $SW_1$. Accordingly, the LCM 10 has no supply and all lights are off, when the main switch $SW_1$ is off.

The LCM 10 is configured to receive user input (usually from the driver of the vehicle) indicating which lights are to be switched on. For this purpose, various switches $SW_2$, $SW_3$, $SW_4$, $SW_5$, and $SW_6$ are connected to the LCM 10, which is configured to detect the switching state of the switches $SW_2$, $SW_3$, $SW_4$, $SW_5$, and $SW_6$. This may be accomplished in many different ways. In the present example, the switches $SW_2$, $SW_3$, $SW_4$, $SW_5$, and $SW_6$ are connected between corresponding digital inputs of the LCM 10 and a supply node SUP, which is at battery voltage $V_B$ when the main switch SW1 is on. The LCM 10 may include internal pull-down resistors (not shown in FIG. 1) connected between the digital inputs and a ground node, which is at ground potential ($V_{GND}$, e.g. 0 volts). The voltage level at a digital input will be substantially equal to the battery voltage $V_B$ when the respective switch is on and at ground potential when the switch is off. Various different ways to design digital inputs are as such known and thus not further discussed herein.

In the depicted example, the switch $SW_2$ may be coupled to the brake pedal and used to activate/deactivate the stop lights. The switch $SW_3$ may activate/deactivate the tail lights and (not shown in FIG. 1) the daytime running lights. The switch $SW_4$ may activate/deactivate the head lights and allows to switch over between high beam and low beam, while the switch $SW_5$ (pass switch) activates the high beam for the time it is pressed (headlight flasher). Finally, the switch $SW_6$ activates/deactivates the right or left turn signals. Dependent on the specific design of the vehicle, further switches may be used. In the concept illustrated in FIG. 1, the switches need to be either micro-switches or need a bleeder resistor (when conventional high-current switches are used as it is commonly the case when switching light bulbs) coupled thereto to ensure a reliable switching.

The LCM 10 includes a switching converter which usually provides defined output currents to the LED modules. Suitable multiple-output switching converters are as such known and thus not further discussed herein. A specific LED module is provided with current when the LCM receives a user input via the respective switch. In FIG. 1, an LED module is symbolized by a single diode. It is understood that, in practice, an LED module includes a plurality of LEDs coupled in series. In the depicted example, the LED modules $LED_{2A}$, $LED_{2B}$, and $LED_{2C}$ represent the stop lights (left, middle right). The LED modules $LED_{4A}$ and $LED_{4B}$ represent the low beam head lights and the LED modules $LED_{4C}$ and $LED_{4D}$ represent the high beam head lights (left and right, respectively). The LED modules $LED_{4E}$ and $LED_{4F}$ represent the tail lights, and the LED modules $LED_{6A}$, $LED_{6B}$, $LED_{6C}$, $LED_{6D}$, and $LED_{6B}$ represent the turn signals (left/right, front/rear).

Each LED module is connected between a respective output of the LCM 10 and ground potential $V_{GND}$, wherein the ground terminals of the LED modules are usually connected to the vehicle body, which is at ground potential, so that only a single line is needed between the LCM 10 and each LED module.

Figure 2:
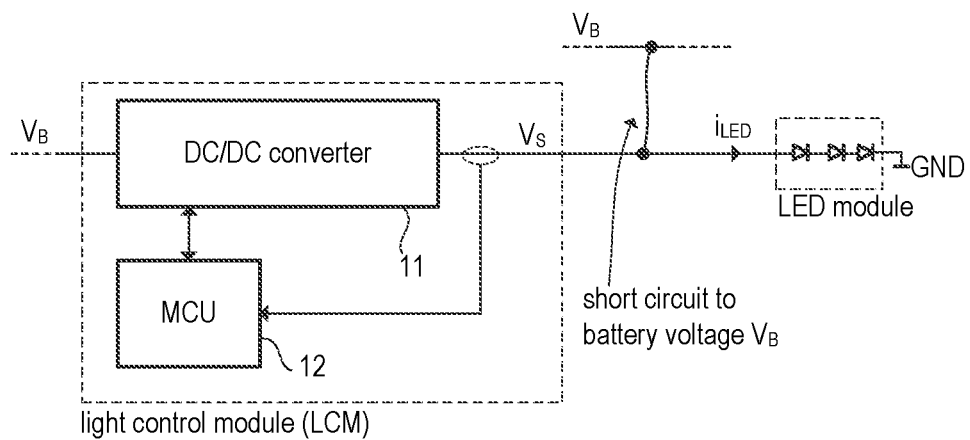
FIG. 2 illustrates how a short circuit between battery voltage and the LED module may cause damage of the LED module.

FIG. 2 illustrates parts of an LCM in more detail, in particular the switching converter (DC/DC converter 11) and a controller 12, which may be microcontroller or any other suitable control circuit. To keep the illustration simple, the switches are omitted in FIG. 2 and only one LED module is shown. Of course, in any practical application, the LCM 10 will have multiple outputs (output terminals, to which LED modules may be connected) as shown in FIG. 1. The output voltage of the DC/DC converter 11 provided to the LED module is denoted as $V_S$, wherein $V_S$ is positive and usually smaller than the battery voltage $V_B$ ($V_B > V_S$). The output current $i_{LED}$ supplied to the LED module may be regulated. That is, the voltage $V_S$ is controlled such that the output current $i_{LED}$ reaches the desired (set-point) value. Suitable controllers and current control concepts for DC/DC converters are as such known and thus not further discussed herein.

FIG. 2 also illustrates a typical failure scenario, namely a short-circuit between battery voltage $V_B$ and the line connecting the LCM 10 and an LED module. As can be seen from the figure, the LEDs in the LED module are not protected and, as the battery voltage $V_B$ may be significantly higher than the voltage $V_S$ provided by the DC/DC converter 11, the load current passing through the LEDs may become very high and destroy the LED module. Of course, some over-current protection circuit could be included in the LED modules, which increases complexity and costs of the LED modules. In the following a new concept for a LCM is discussed, which helps to avoid the problem in the first place.

Figure 3:
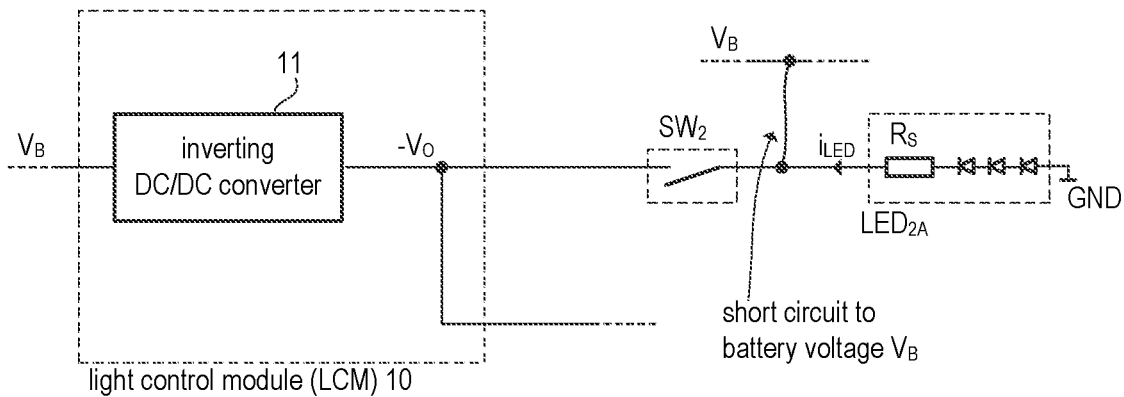
FIG. 3 illustrates one embodiment of an alternative LCM concept, which helps to protect LED modules against short-circuits to battery voltage.

FIG. 3 illustrates an example of an LCM 10 which includes a DC/DC converter 11. Again, the figure includes only the components necessary for the following discussion. Accordingly, the controller 12 has been omitted in FIG. 3. Different from the previous examples, the LCM includes a switching converter 11 that is configured to convert the supply voltage $V_B$ (battery voltage) into a negative output voltage $-V_O$. Accordingly, the output voltage $-V_O$ and the battery voltage $V_B$ have different polarities. The negative output voltage $-V_O$ is applied to one or more output terminals so that these can sink the load currents from the LED modules connected to the respective output terminals. As an illustrative example, FIG. 3 includes the LED module 2A (left stop light, cf. FIG. 1).

As can be seen from FIG. 3, the LED module(s) is (are) connected with reversed polarity (as compared to the example of FIG. 2) between the LCM 10 and the vehicle body (ground potential). FIG. 3 also illustrates a short-circuit between the battery voltage $V_B$ and the line connecting the LCM 10 and the LED module $LED_{2A}$. Different from the previous example of FIG. 2, the LED module $LED_{2A}$ is protected without needing any circuitry for overcurrent protection, just because the LED module $LED_{2A}$ is reversely connected. In the event of a short circuit to battery, the voltage $V_B$ drops across the series circuit of LEDs included in the LED module, while the LEDs are reversely biased, blocking, and the load current is zero (except for a negligible leakage current). The DC/DC-converter ii output may be protected against overvoltage and overcurrent. One example of an overcurrent protection is discussed later with reference to FIG. 4.

The concept illustrated in FIG. 3 also allows to use normal (high-current) switches (without bleeder resistors) coupled between the LCM 10 and the respective LED modules, instead of micro-switches as shown in the example of FIG. 1. This allows reducing complexity of the LCM 10. In FIG. 3, the switch $SW_2$ is connected between an output terminal of the LCM 10 and the LED module $LED_{2A}$. When the switch $SW_2$ is closed, the output terminal of LCM 10 sinks the load current $i_{LED}$ from the LED module $LED_{2A}$. The controller in the LCM 10 (not shown in FIG. 3, cf. FIG. 2) does not need to care about user input and switches. However, the concept described herein does not exclude the use of a switch configuration as shown in FIG. 1. In this case the switch $SW_2$ is not connected between the LCM and the LED module but connected to the LCM (as well as further switches associated with other LED modules and LCM output channels) as it is the case in FIG. 1.

In the example of FIG. 3, the DC/DC converter ii is not current-controlled but provides a constant (negative) output voltage $-V_O$. A resistor may be connected in series with the LEDs of an LED module such as the resistor $R_S$ in LED module $LED_{2A}$. Alternatively, the resistor $R_S$ may be integrated in the LCM 10. A simple series resistor in the LED module for limiting the load current $i_{LED}$ during normal operation is a very cost efficient solution. As mentioned, in a short-circuit scenario, the LEDs of the LED module $LED_{2A}$ are reverse biased and blocking.

Figure 4:
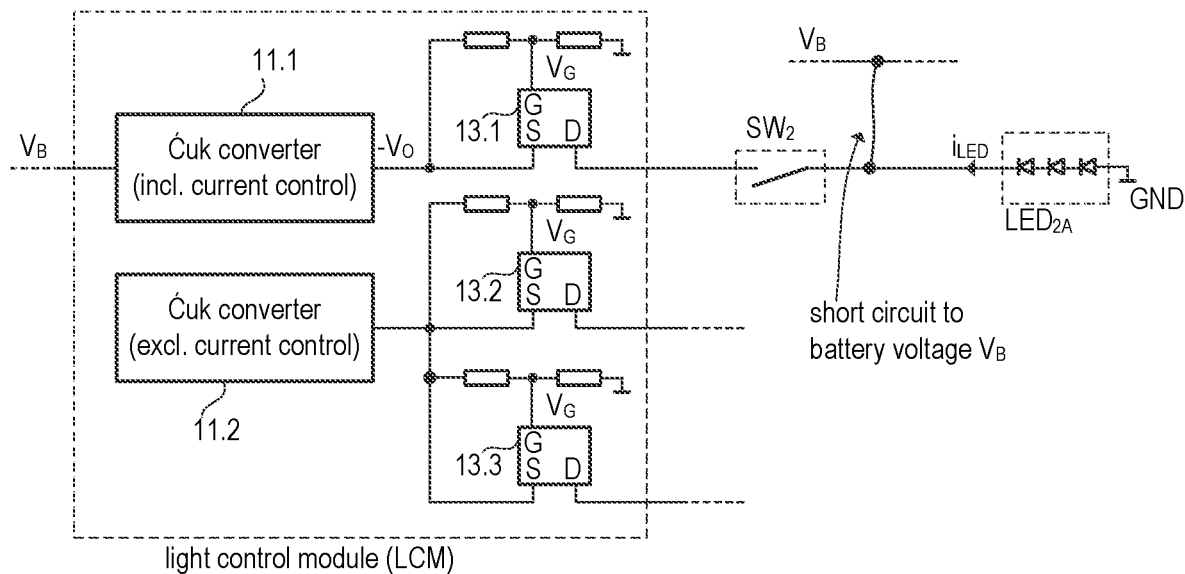
FIG. 4 illustrates a further embodiment, which may be regarded as a further development of the example of FIG. 3.

FIG. 4 illustrates another example of the LCM 10. According to the depicted example, the LCM 10 may include (at least) one output channel that provides a regulated output current $i_{LED}$ and several further output channels that provide a constant output voltage $-V_O$. As in the previous example, the output terminals of the LCM 10 are configured to sink the load currents of the connected LED modules. The DC/DC converter 11.1 generates a negative output voltage $-V_O$ and includes a current regulator to sink a regulated load current of the connected LED module $LED_{2A}$, i.e. the output voltage $-V_O$ is regulated such that the load current $i_{LED}$ sunk from the output terminal reaches a desired value. A DC/DC converter 11.1 generates the negative output voltage for the other output channels.

In the example of FIG. 4, the output channels of the LCM 10 are protected by smart switches 13.1, 13.2, 13.3. These switches may include, for example, transistors such as MOSFETs or the like whose gate electrodes are biased to switch them on when DC/DC converters 11.1 and 11.2 output a negative output voltage. So, during normal operation, the smart switches 13.1, 13.2, 13.3 are always on. However, the smart switches may also include protection mechanisms such as an over-current protection, an over-temperature protection, etc. Suitable smart switches are commercially available (e.g. Infineon HITFET Series Low Side Power Switch ICs) and are thus not further discussed herein in more detail.

As the first channel provides a current regulation in the example of FIG. 4, the connected LED module $LED_{2A}$ does not have to include a current limiting resistor (cf. resistor $R_S$ in FIG. 3). One example of a suitable DC/DC converter that may be used in the examples of FIGS. 3 and 4 is an inverting Ćuk converter. It is understood that, dependent on the actual application, another inverting switching converter topology may be used instead.

Various aspects of the embodiments described herein are summarized below. IT is understood that the following is not an exhaustive list but merely an exemplary summary. One embodiment relates to a light control module (LCM). The LCM includes terminals configured to receive a supply voltage (e.g. from an automotive battery) and a switching converter configured to receive the supply voltage and to generate an output voltage at an output node of the switching converter. The output voltage and the supply voltage have different polarities, i.e. the output voltage is negative whereas the battery voltage is positive with respect to ground potential. The LCM further comprises at least one output terminal coupled to the output node of the switching converter and configured to sink a load current from an LED module that is connected to the output terminal during operation.

In one example, the LCM includes a smart switch connected between the output node of the switching converter and the output terminal. The smart switch includes a transistor which is configured to provide an overcurrent protection. The switching converter is an inverting switching converter such as an inverting Ćuk converter (see FIG. 4)

In some embodiments the (negative) output voltage may be constant. In this case, the LED module may include a resistor for current limitation. Alternatively, the resistor may be included in the LCM or arranged somewhere else in the current path between the LCM and the LED module. In other embodiments, the (negative) output voltage may be adjusted such that the load current sunk from the LED modules reaches a desired set-point value.

Another embodiment relates to an automotive lighting system which includes the light control module discussed above as well as an automotive battery that is configured to provide the supply voltage to the light control module, and one or more LED modules each including at least one LED, wherein each LED module is coupled between a respective output terminal of the light control module and a ground terminal, which usually is (but not necessarily has to) be connected to the automobile's body.

As mentioned above, the LED module(s) may include a current limiting device (see, for example, resistor $R_S$ in FIG. 3). The system may further include a switch coupled between some or each one of the output terminals of the light control module and the LED module (see, for example, FIG. 4, switch $SW_3$). A bleeder resistor or the like is not required to ensure a reliable switching.

Figure 5:
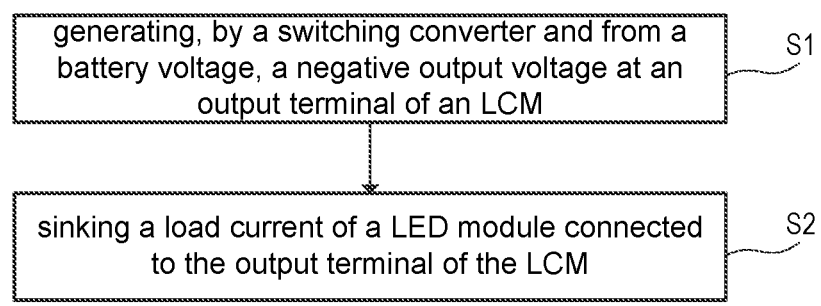
FIG. 5 is a flow chart illustrating one embodiment of a method for driving LED modules.

FIG. 5 is a flow chart illustrating one example of a method for driving LED modules by ab automotive LCM. Accordingly, the method includes receiving—by the LCM—a battery voltage (see also FIG. 3, voltage $V_B$) and providing—by a switching converter of the LCM—an output voltage (see also FIG. 3, voltage $-V_O$) at an output node (FIG. 5, box S1). The output voltage and the supply voltage have different polarities, i.e. the output voltage is negative while the battery voltage is positive with respect to ground potential. The method further includes sinking a load current from an LED module connected to an output terminal of the LCM, wherein the output terminal is coupled to the output node of the switching converter (FIG. 5, box S2).

The method may further include switching the LED module on and off using a switch that is coupled between the LED module and the LCM. A bleeder resistor or the like is not required for reliable switching. The (negative) output voltage may be a constant voltage or regulated such that the sunk load current reaches a desired set-point value. Particularly in the case of a constant output voltage, the LED module may include a resistor connected in series to the LEDs of the LED module to limit the load current of the LED module. Additionally or alternatively, the resistor may be included in the LCM or arranged anywhere else in the current path between the LED module and the LCM. Aground terminal of the LED module may be connected to the automobile's body. As discussed in greater detail above, the LED module is reversely connected as compared to known concepts and is thus protected against short circuits to battery voltage.

Although the invention has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the invention.

What is claimed is:

1. A light control module comprising:
   terminals configured to receive a supply voltage;
   a first switching converter configured to receive the supply voltage and to provide a first output voltage at a first output node, and configured to adjust the first output voltage such that a first load current reaches a desired set-point value, the first output voltage and the supply voltage having different polarities;
   a first output terminal coupled to the first output node of the first switching converter and configured to sink the first load current from a first LED module;
   a second switching converter configured to receive the supply voltage and to provide a constant second output voltage at a second output node; and
   at least one second output terminal coupled to the second output node of the second switching converter and configured to sink at least one second load current from at least one second LED module, wherein the second switching converter is not configured to control the at least one second load current to a corresponding set-point value.

2. The light control module of claim 1, further comprising a smart switch connected between the second output node of the second switching converter and the at least one second output terminal, the smart switch being configured to provide overcurrent protection.

3. The light control module of claim 1, wherein the first switching converter is an inverting Ćuk converter.

4. The light control module of claim 3, wherein the second switching converter is a further inverting Ćuk converter.

5. The light control module of claim 1, wherein the constant second output voltage is a constant negative voltage.

6. The light control module of claim 1, wherein the first LED module is coupled between the first output terminal and a ground node to reverse bias one or more LEDs in the first LED module in a failure scenario in which there is a short-circuit between the first output terminal and a supply node configured to receive the supply voltage.

7. The light control module of claim 6, wherein the at least one second LED module is coupled between a corresponding second output terminal of the at least one second output terminal and the ground node to reverse bias one or more LEDs in the at least one second LED module in a failure scenario in which there is a short-circuit between the second output terminal and the supply node configured to receive the supply voltage.

8. An automotive lighting system comprising:
 a light control module including,
  terminals configured to receive a supply voltage,
  a first switching converter configured to receive the supply voltage and to provide a first output voltage at a first output node, and configured to adjust the first output voltage such that a first load current reaches a desired set-point value, the first output voltage and the supply voltage having different polarities, and
  a first output terminal coupled to the first output node of the first switching converter and configured to sink a first load current from a first LED module,
  a second switching converter configured to receive the supply voltage and to provide a constant second output voltage at a second output node, and
  at least one second output terminal coupled to the second output node of the second switching converter and configured to sink at least one second load current from at least one second LED module, wherein the second switching converter is not configured to control the at least one second load current to a corresponding set-point value;
 an automotive battery configured to provide the supply voltage to the light control module;
 the first LED module including at least one first LED, wherein the first LED module is coupled between the first output terminal of the light control module and a ground terminal; and
 the at least one second LED module including at least one second LED, wherein the at least one second LED module is coupled between the at least one second output terminal and the ground terminal.

9. The automotive lighting system of claim 8, wherein the at least one second LED module includes a current limiting device.

10. The automotive lighting system of claim 9, wherein the current limiting device is a smart switch.

11. The automotive lighting system of claim 9, wherein the second switching converter is a further inverting Ćuk converter.

12. The automotive lighting system of claim 8, further including:
 a first switch coupled between the first output terminal of the light control module and the first LED module.

13. The automotive lighting system of claim 8, further comprising at least one smart switch connected between the second output node of the second switching converter and the at least one second output terminal, the smart switch being configured to provide overcurrent protection.

14. The automotive lighting system of claim 8, wherein the first switching converter is an inverting Ćuk converter.

15. The automotive lighting system of claim 8, wherein the first LED module is coupled between the first output terminal and a ground node to reverse bias one or more LEDs in the first LED module in a failure scenario in which there is a short-circuit between the first output terminal and a supply node configured to receive the supply voltage.

16. A method comprising:
 receiving, by a light control module, a supply voltage;
 providing, by a first switching converter of the light control module, a first output voltage at a first output node, the first output voltage and the supply voltage having different polarities;
 regulating, by the first switching converter, a first load current provided by the first output node;
 providing, by a second switching converter of the light control module, a second output voltage at a second output node, the second output voltage and the supply voltage having different polarities, wherein a second load current provided by the second output node is not regulated, and the second output voltage is a constant voltage;
 sinking the first load current from a first LED module connected to the first output node; and
 sinking the second load current from at least one second LED module connected to the second output node.

17. The method of claim 16,
 wherein the supply voltage is provided by an automotive battery.

18. The method of claim 16 further comprising reverse biasing one or more LEDs in the first LED module in response to a failure scenario presenting a short-circuit between the first output node and supply node configured to receive the supply voltage.

19. The method of claim 18, wherein:
 the first LED module includes a plurality of LEDs connected in series; and
 regulating the first load current comprises regulating the first load current to a desired set-point value.

20. The method of claim 16, further comprising limiting the second load current via a current limiting device coupled between the second output node and the at least one second LED module.

* * * * *